(12) United States Patent
Kanteti (10) Patent No.: US 11,693,594 B2
(45) Date of Patent: Jul. 4, 2023

(54) ZONE STRIPED ZONE NAMESPACE MEMORY

(71) Applicant: Micron Technology, Inc., Boise, ID (US)

(72) Inventor: Kumar V K H Kanteti, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 29 days.

(21) Appl. No.: 17/301,214

(22) Filed: Mar. 29, 2021

(65) Prior Publication Data

US 2022/0308792 A1 Sep. 29, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| 11,340,987 | B1* | 5/2022 | Gole | G06F 3/0619 |
| 2003/0074486 | A1* | 4/2003 | Anastasiadis | H04L 65/80 |
| | | | | 719/321 |
| 2013/0246890 | A1* | 9/2013 | Au | G06F 11/1068 |
| | | | | 714/764 |
| 2016/0170870 | A1* | 6/2016 | Camp | G06F 12/0246 |
| | | | | 711/103 |
| 2016/0283125 | A1* | 9/2016 | Hashimoto | G06F 3/0616 |
| 2017/0024137 | A1* | 1/2017 | Kanno | G06F 12/0246 |
| 2019/0146907 | A1* | 5/2019 | Frolikov | G06F 3/0679 |
| | | | | 711/103 |
| 2020/0089407 | A1* | 3/2020 | Baca | G06F 3/0635 |
| 2020/0150899 | A1* | 5/2020 | Kim | G06F 3/0656 |
| 2021/0072927 | A1* | 3/2021 | Yang | G06F 3/0631 |
| 2022/0171540 | A1* | 6/2022 | Lublin | G06F 3/0673 |

* cited by examiner

*Primary Examiner* — Yaima Rigol
(74) *Attorney, Agent, or Firm* — Lowenstein Sandler LLP (57) ABSTRACT

A system can determine a memory range associated with data stored in a zone namespace. The system can identify a plurality of zones in the zone namespace for the memory range at the one or more memory devices, where the data is distributed across the plurality of zones. The system can perform a striped memory access operation on the plurality of zones to retrieve the data.

20 Claims, 7 Drawing Sheets

ZONE STRIPED ZONE NAMESPACE MEMORY

TECHNICAL FIELD

Embodiments of the disclosure relate generally to memory sub-systems, and more specifically, relate to a zone striped zone namespace memory in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to zone striped zone namespace (zns) memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include multiple memory devices that can store data from a host system. One example of a non-volatile memory device is a negative-and (NAND) memory device. Other examples of non-volatile memory devices are described below in conjunction with FIG. 1. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Various applications can have one or more input/output (I/O) streams to access the memory devices of the memory sub-system. For example, the streams can includes a series of memory access requests/or commands for accessing the memory devices. When a request pertains to programming data to the memory device, the I/O stream can include a copy of the data to be programmed. Depending on the source of the I/O streams, different streams can have different characteristics. For example the source of an I/O stream can be a database application, such as Apache Cassandra or any other database application, which can generate one or more streams for data logging, ingestion, compaction, etc.

Each stream has a unique performance characteristic. For example, logging functionalities utilize a high bandwidth, and can affect host I/O performance while being continuously available. Compaction functionalities periodically run in the background to maintain the source (e.g., Cassandra) data trees and require a burst of bandwidth, which directly impacts ingestion functionalities and I/O performance.

Certain memory devices can be configured with a zone namespace. In a zone namespace, the address space of the memory device is divided into zones which allows for more efficient management of data as the capacity of the memory device increases. With a zone namespace, writes are performed sequentially starting from the beginning of each zone. Data within a zone typically cannot be arbitrarily overwritten. Instead, the zone write pointer is usually reset, effectively deleting the data in the zone and writing of data can be restarted from the beginning of the zone.

Some applications can have a lower performance when interacting with a memory device configured with a zone namespace. For example, depending on the unique characteristics of a stream, assigning a stream to a zone can limit the performance of the associated application according to a conventional approach. If a particular stream requires a bandwidth greater than a bandwidth supplied by a zone in the zone namespace to which the stream is allocated, performance will correspondingly suffer. Furthermore, if an application dominantly uses a particular stream, the performance is limited to the bandwidth of the one zone assigned to the stream. The one stream to one zone assignment unnecessarily limits the performance of an application when memory devices configured with a zone namespace can operate simultaneously with multiple active zones.

Aspects of the present disclosure address the above and other deficiencies by providing applications access to memory devices configured with a zone namespace where a particular stream has access to a plurality of zones that are striped across one or more memory devices. In one embodiment, a processing device in a memory sub-system determines a memory range associated with data stored in a zone namespace and identifies multiple zones in the zone namespace for the memory range at one or more memory devices. The processing device further performs a striped memory access operation on the multiple zones to retrieve the data. In another embodiment, the processing device receives a data stream, including multiple data blocks, from an application. The processing device can segment at least one of the data blocks into multiple zone blocks and store the zone blocks across multiple zones in a zone namespace.

Advantages of the approach described herein include, but are not limited to, improved performance in the memory sub-system. Compared with assigning an application stream to one zone, assigning an application stream to multiple zones, with simultaneous access to multiple zones, enhances the throughput of an application stream. Accordingly, read and program latency is reduced in the memory sub-system, and the quality of service provided to the host system and the source of the data streams is improved.

Figure 1:
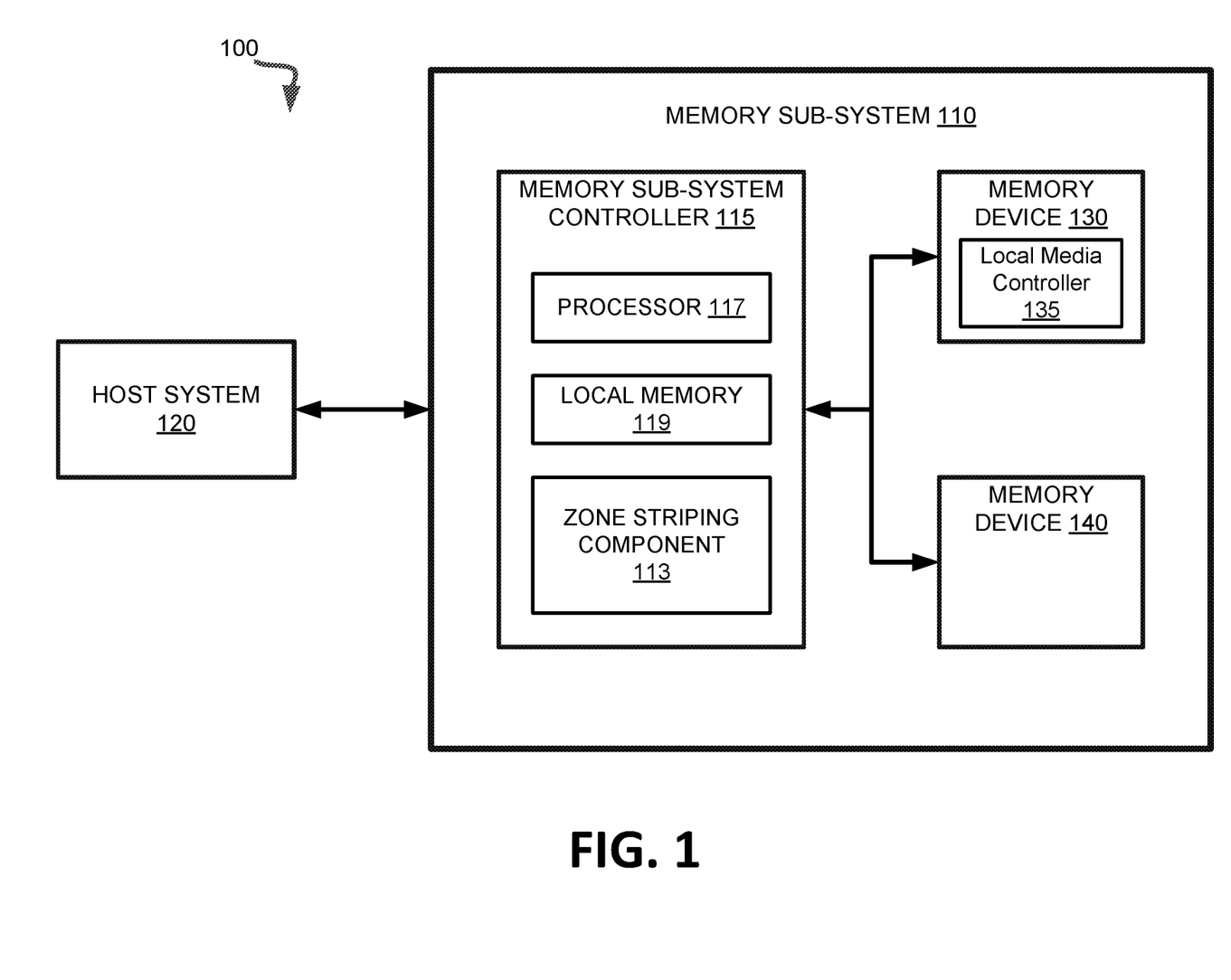
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a zone striping component 113 that can stripe data across multiple zones. In one embodiment, zone striping component 113 can identify several zones that are mapped to a variable sized zone, where the variable sized zone is used for a stream of a host application. In some embodiments, the memory sub-system controller 115 includes at least a portion of the zone striping component 113. In some embodiments, the zone striping component 113 is part of the host system 110, an application, or an operating system. In other embodiments, local media controller 135 includes at least a portion of zone striping component 113 and is configured to perform the functionality described herein. Zone striping component 113 can map one or more zones to a variable sized zone and cause the one or more zones to appear as a variable sized zone to the host application. Further details with regards to the operations of the host striping component 113 are described below.

Figure 2:
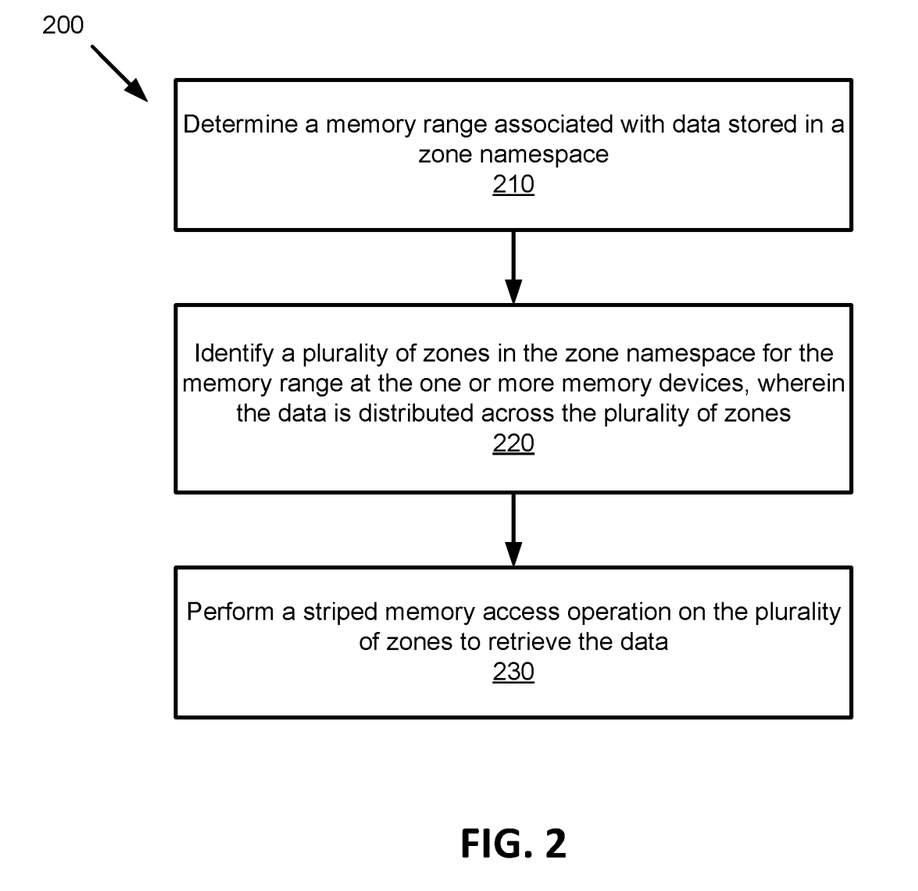
FIG. 2 is a flow diagram of an example method to read data from one or more memory devices configured with a zone namespace (zns) in accordance with some embodiments of the present disclosure.

FIG. 2 is a flow diagram of an example method 200 to read data from one or more memory devices configured with a zone namespace (zns), in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the zone striping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic determines a memory range associated with data stored in a zone namespace. The memory range can be a variable sized zone assigned to an application stream, where the variable sized zone includes one or more zones in one or more memory devices configured with a zone namespace. For example, the memory range can be associated to a preconfigured zone size according to a type of application associated with the application stream specified by one or more configuration files associated with the zone striping component 113. In another embodiment, the zone size can be configured by a user of the memory device through the one or more configuration files. Processing logic can instantiate the memory range and assign the memory range to an application stream responsive to receiving a request from the application stream according to the configuration settings in the one or more configuration files.

At operation 220, the processing logic identifies a number of zones in the zone namespace for the memory range at the one or more memory devices, wherein the data is distributed across the zones. Identifying the number of zones can be performed using zone identifiers for the plurality of zones. For example, if a memory device has zones with identifiers 0 to 4. A first I/O stream can be assigned to zone 0, a second I/O stream can be assigned to zone 1, and so forth. Note that each zone identifier can correspond to a continuous physical address range of memory in the memory device and the zone identifiers are identifiable using zone mapping tables mapping available zones to physical memory addresses of the memory devices.

In one embodiment, identifying the zones in the zone namespace includes identifying a first zone on a first memory device and a second zone on a second memory device. For example. zone 0 of memory device 0, and zone 0 of memory device 1 can be assigned to stream 0. In another embodiment, identifying the zones in the zone namespace includes identifying a first zone on a first memory device and a second zone on the first memory device. For example, zone 0 of memory device 0, and zone 1 of memory device 0 can be assigned to stream 0.

At operation 230, the processing logic performs a striped memory access operation on the zones to retrieve the data. For example, performing the striped memory access operation includes accessing multiple zone blocks storing data associated with the application stream simultaneously. These multiple zone blocks are arranged in a stripe across multiple zones in the zone namespace. Thus, the striped memory access operation can increase the bandwidth for the application stream. For example, the processing logic can retrieve multiple zone blocks within one read access latency, whereas if the application stream is assigned to one zone, the same read access latency retrieves only one zone block. Since multiple sequentially accesses to the same zone would be performed, the total latency would be much higher. In one embodiment, performing a striped memory access operation on zones includes accessing a plurality of zone blocks from the zone namespace by accessing, in parallel, a first zone block from a first zone and a second zone block from a second zone.

In one embodiment, processing logic further programs data to the memory range (variable size zone) at a write pointer for the memory range, where the write pointer of the memory range is determined from a sum of the write pointers of each of the plurality of zones corresponding to the memory range. For example, for a memory range striped with three zones, if the write point of the three zones are 0x0004, 0x0004, 0x0004, the write pointer for the memory range is the sum of the three zones, e.g., write pointer equals (0x0004, 0x0004, 0x0004)=0x000C.

Figure 3:
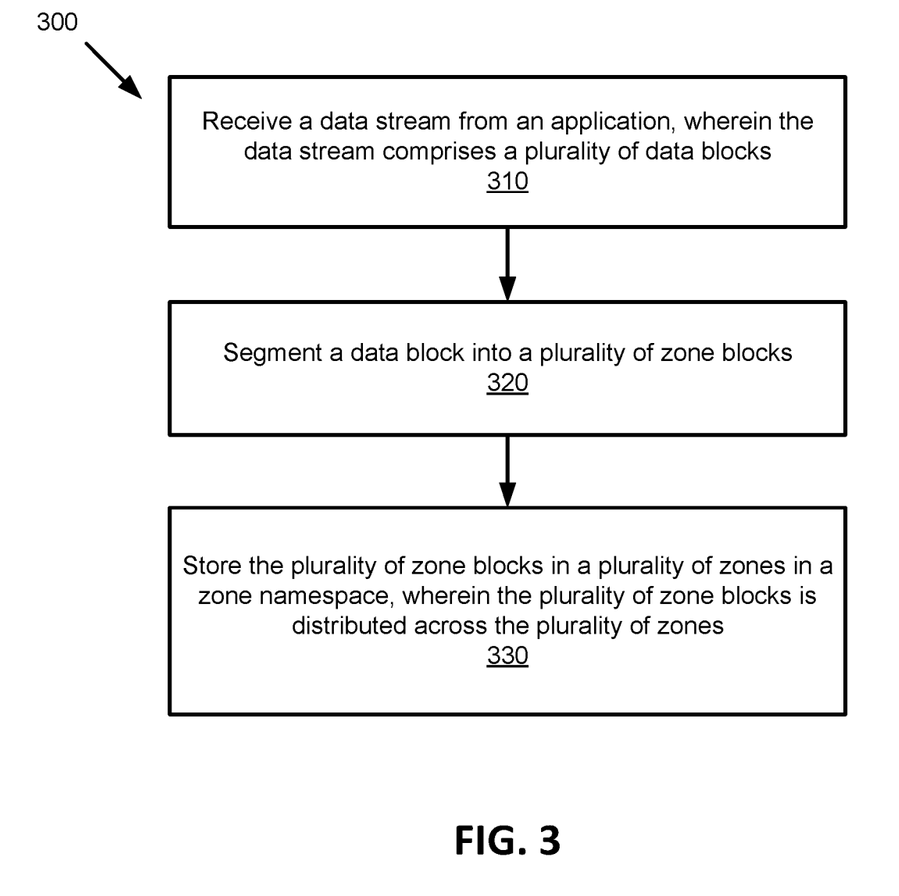
FIG. 3 is a flow diagram of an example method to store data to one or more memory devices configured with a zone namespace (zns) in accordance with some embodiments of the present disclosure.

FIG. 3 is a flow diagram of an example method 300 to write data to one or more memory devices configured with a zone namespace (zns), in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the zone striping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives a data stream from an application, wherein the data stream includes a plurality of data blocks. The application can be a database and the data stream can be data that the database is storing to the memory system. The data blocks can have a block size equal to the stripe size multiplied by the zone block size. Here, the size of the data blocks can be managed by the operating system kernel and is agnostic to the application stream. For example, block size (196 kB) equal to the stripe size (3) multiplied by the zone block size (64 kB), for a stream that is striped with three zones. Although the zone block size is shown as 64 k, the zone block size can be other multiples of 4 kB.

At operation 320, the processing logic segments a data block into multiple zone blocks. For example, the application block size (196 kB) is segmented by the stripe size (3) into three zones blocks. Each zone block is to be written to a zone of the multiple zones (3 zones) corresponding to the stream, in a predetermined ordering according to identifiers of the zones, e.g., writes in the ordering of zone 0, zone 1, and zone 2. The zone identifiers/indices can be assigned, by a memory controller of the memory device, to map to physical memory addresses of the memory device when the memory device is configured with a zone namespace.

At operation 330, the processing logic stores the multiple zone blocks in multiple zones in a zone namespace, where the plurality of zone blocks is distributed across the zones. For example, the zone blocks are written to the zones across one or more memory devices that are assigned to the stream according to their zone indices. These assigned zones can be mapped to the stream, by the zone striping component 113, according to the zone indices and memory device indices. Because the zones are written sequentially, the zone blocks are appended to the zones according to a write pointer of the zone.

In one embodiment, a stream can store data to a first zone on a first memory device and a second zone on a second memory device. For example, zone 0 of memory device 0, and zone 0 of memory device 1 can be assigned to stream 0. In one embodiment, a stream can store data to a first zone on a first memory device and a second zone on the first memory device. For example, zone 0 of memory device 0, and zone 1 of memory device 0 can be assigned to stream 0.

In one embodiment, processing logic further programs data to the zones (i.e., variable size zones that are striped across the memory devices) at a write pointer corresponding to the stream, where the write pointer for the stream is determined from a sum of the write pointers of each of the zones assigned to the stream.

Figure 4:
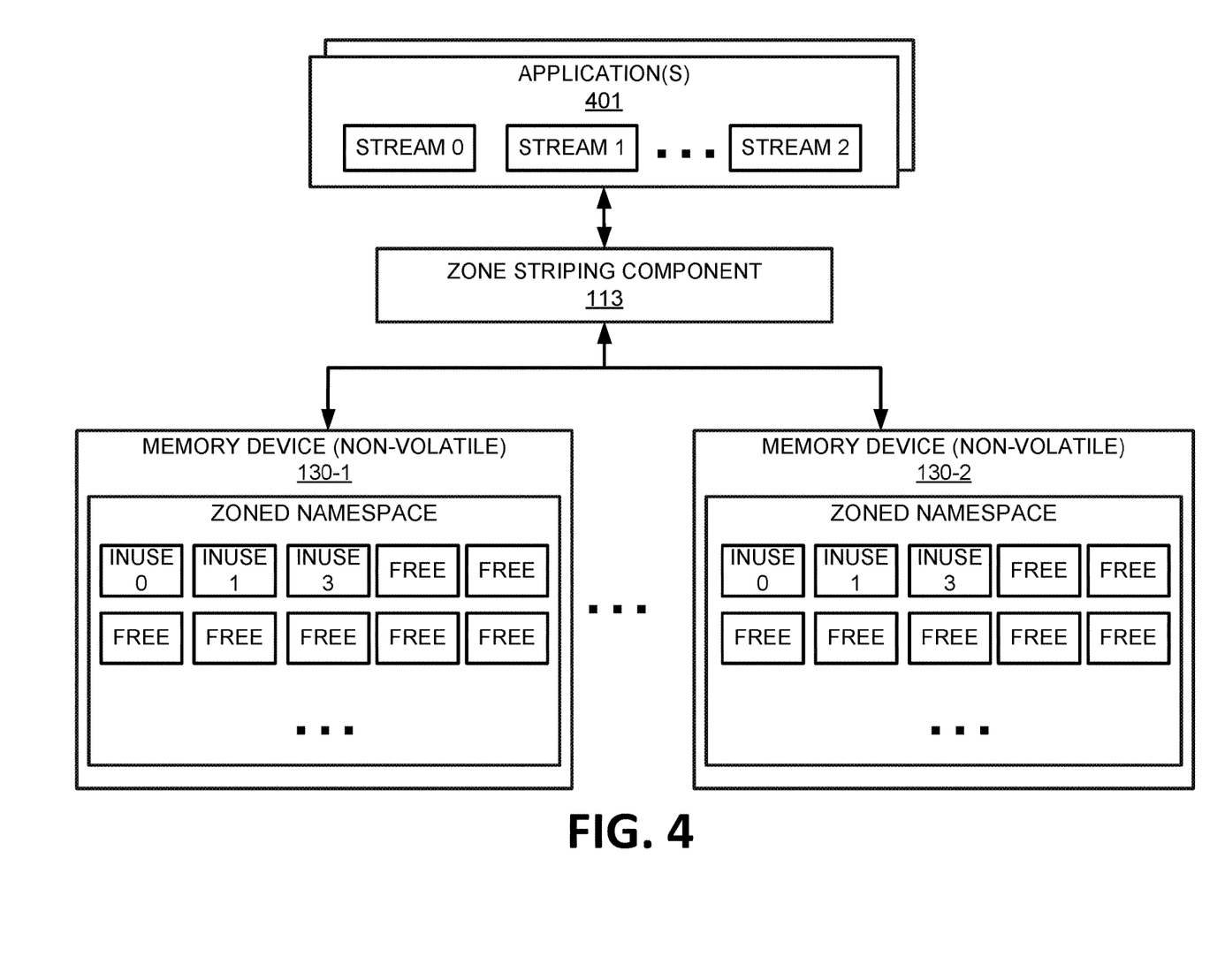
FIG. 4 is a block diagram illustrating application streams mapped to two or more memory devices in accordance with some embodiments of the present disclosure.

FIG. 4 is a block diagram illustrating application streams mapped to two or more memory devices in accordance with some embodiments of the present disclosure. Application 401 may represent any software executed on a host system 120. Application 401 can be a standalone application, or a database application, such as Apache Cassandra, or a file system running on an operating system on host system 120. For example, Cassandra (application 401) can generate input/output (I/O) stream 0, which corresponds to a processing thread of the application that logs information about a health of the application, I/O stream 1 which corresponds to a compaction thread, and I/O stream 2 which corresponds to an ingestion thread.

Cassandra can output a number of logs including system logs, debug logs, and garbage collection logs, where the amount of details in the logs are configurable by a user through the application. The system logs are useful for a user of the application to manually review and investigate events related to the health/debugging/garbage collection of the application. Logging events can occur periodically. Cassandra creates files in the file system which are immutable. A compaction process creates new immutable files. Compaction can automatically occur periodically in response to some predetermined event or compaction can be triggered manual by a user activation event. Data ingestions is the process of bringing in data from other sources (e.g., applications) into Cassandra. Data that are ingested can be indexed for query, analytics, modeling, reporting, etc. Data ingestion can have the characteristics of a continuous throughput. These Cassandra tasks have different bandwidth and/or throughput characteristics, thus they can be better managed by separate I/O streams, such as streams 0-2. In one embodiment, zone striping component 113 is configured to map streams 0-2 of application 401 to zones on memory devices 130. For example, stream 0 can be mapped to zones 0 of memory devices 130-1 and 130-2, stream 1 can be mapped to zones 1 of memory devices 130-1 and 130-2, stream 2 can be mapped to zones 2 of memory devices 130-1 and 130-2, and so forth.

Zone striping component 113 can contain a mapping table that stores name-value pairs for the stream mapping to the one or more zones. In one embodiment, streams of various applications are identified by unique tag identifiers. Zone striping component 113 then assigns these streams to zones that are not assigned to a stream when the streams communicate an I/O packet to the memory devices 130-1 and 130-2. For example, zone striping component 113 can assign a stream tag identifier with a corresponding name-value pair, such as stream0:dev0_zone0, dev1_zone0, where the name is the tag identifier denoting stream0, and the value contains: dev0 zone 0 corresponding to device 0 zone 0, and dev1 zone 0 corresponding to device 1 zone 0.

In one embodiment, the write pointer for stream 0 is calculated using write pointers of the zones assigned to stream 0. For example, if the write pointer at dev 0 zone 0 is 0x0004 and the write pointer at dev 1 zone 0 is 0x0004, the write pointer for the stream is sum of the write pointers of its corresponding zones, 0x0004+0x0004=0x0008.

The application stream block size can be a sum of the zone block size among the zones assigned to the application stream. A block size is a minimum unit of data for a write or read access. For example, if the zone block size is 64 kB, and two zones are assigned to stream0, the block size for stream0 is 128 kB.

Figure 5:
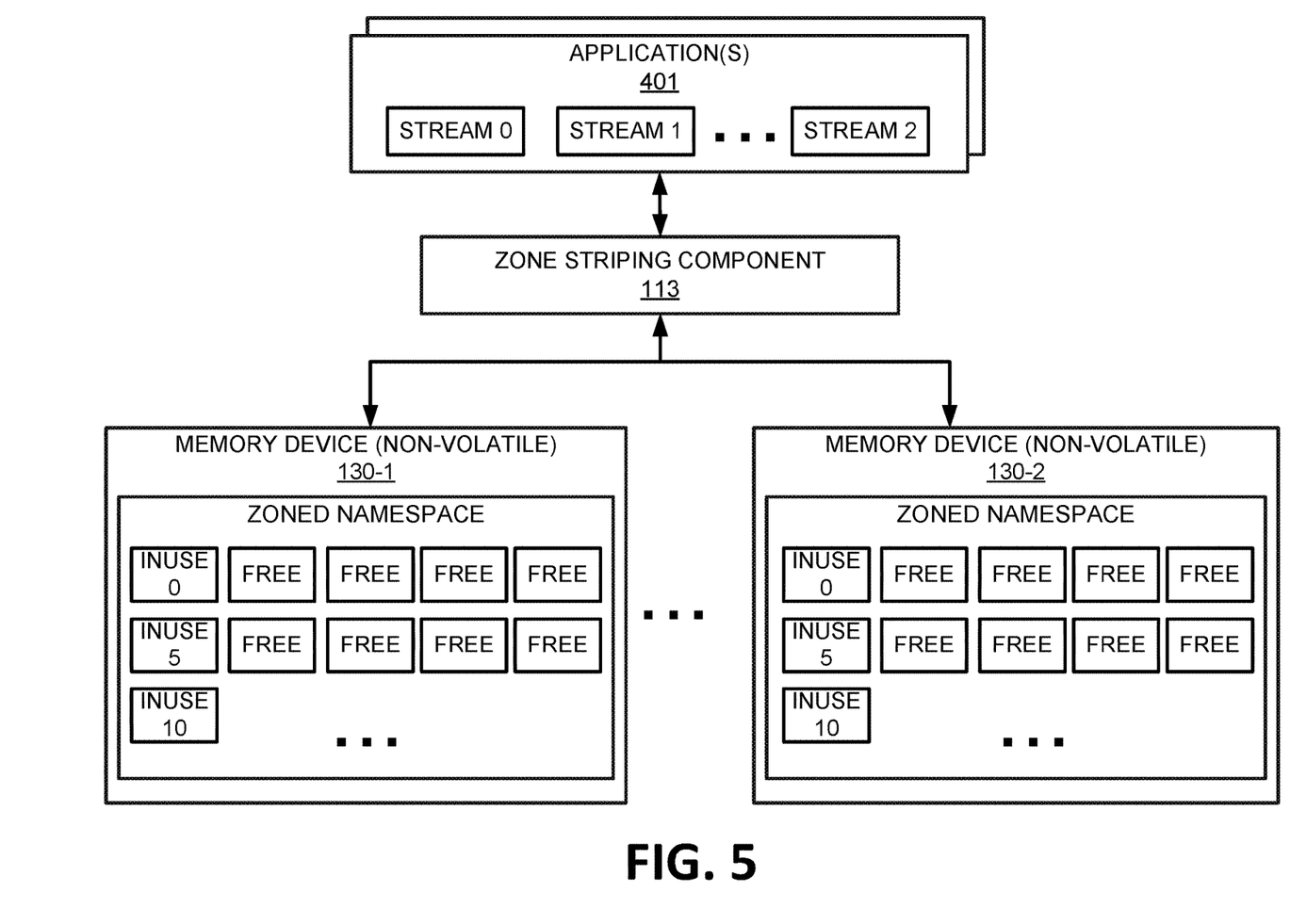
FIG. 5 is a block diagram illustrating application streams mapped to two or more memory devices in accordance with some embodiments of the present disclosure.

FIG. 5 is a block diagram illustrating application streams mapped to two or more memory devices in accordance with some embodiments of the present disclosure. Application 401 may represent any software executed on a host system 120. For example, application 401 can be a B-tree file system (BTRFS) (a copy on write file system format for Linux) running on a Linux operating system on host system 120. BTRFS stores host data separately from metadata. BTRFS metadata is data that describes the underlying BTRFS data. In this case, application 401 can have input/output (I/O) stream 0 corresponding to BTRFS metadata I/O, I/O stream 1 corresponds to BTRFS data I/O, and I/O stream 2 corresponds to another BTRFS data I/O.

In one embodiment, zone striping component 113 is configured to map streams 0-2 of application 401 to a plurality of zones on memory devices 130-1 and 130-2. For example, stream 0 can be mapped to zones 0 of memory devices 130-1 and 130-2, stream 1 can be mapped to zones 5 of memory devices 130-1 and 130-2, and stream 2 can be mapped to zones 10 of memory devices 130-1 and 130-2, and so forth. Zone striping component 113 can contain a mapping table that stores name-value pairs for the stream mapping to the one or more zones.

Figure 6:
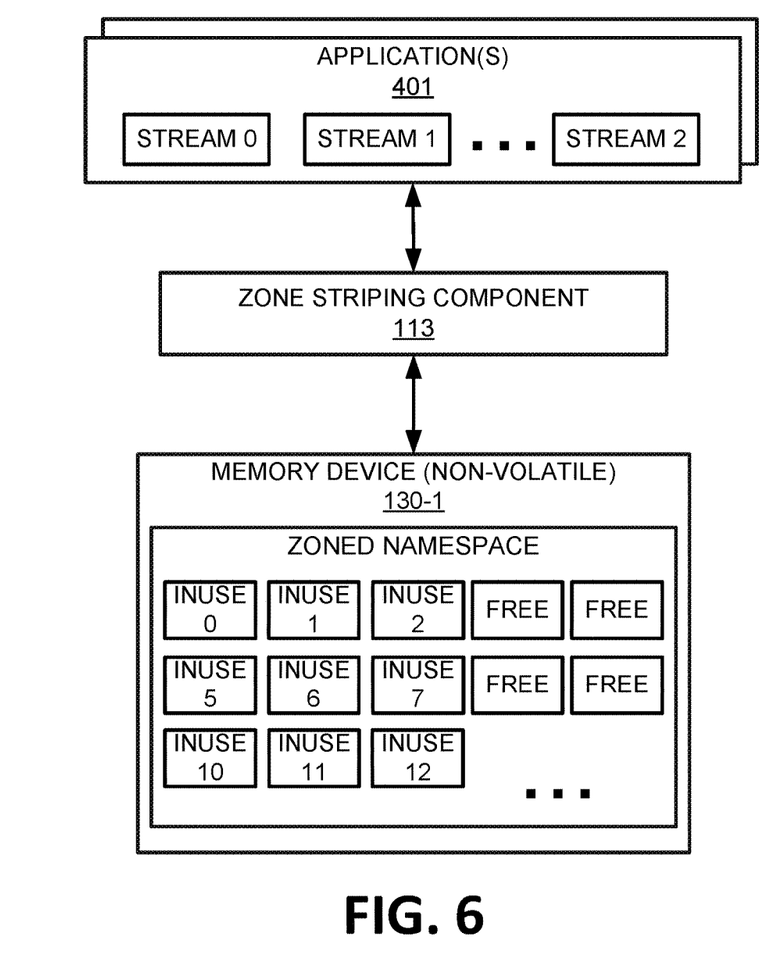
FIG. 6 is a block diagram illustrating application streams mapped to a memory device in accordance with some embodiments of the present disclosure.

FIG. 6 is a block diagram illustrating application streams mapped to a memory device in accordance with some embodiments of the present disclosure. Application(s) 401 may represent any software executed on a host system 120. For example, application 401 can be Apache Cassandra and/or BTRFS running on a Linux operating system on host system 120.

In one embodiment, zone striping component 113 is configured to map streams 0-2 of application 401 to a plurality of zones on memory device 130-1. For example, stream 0 can be mapped to zones 0-2 of memory device 130-1, stream 1 can be mapped to zones 5-7, and stream 2 can be mapped to zones 10-12. Zone striping component 113 can contain a mapping table that stores name-value pairs for the stream mapping to the one or more zones.

Figure 7:
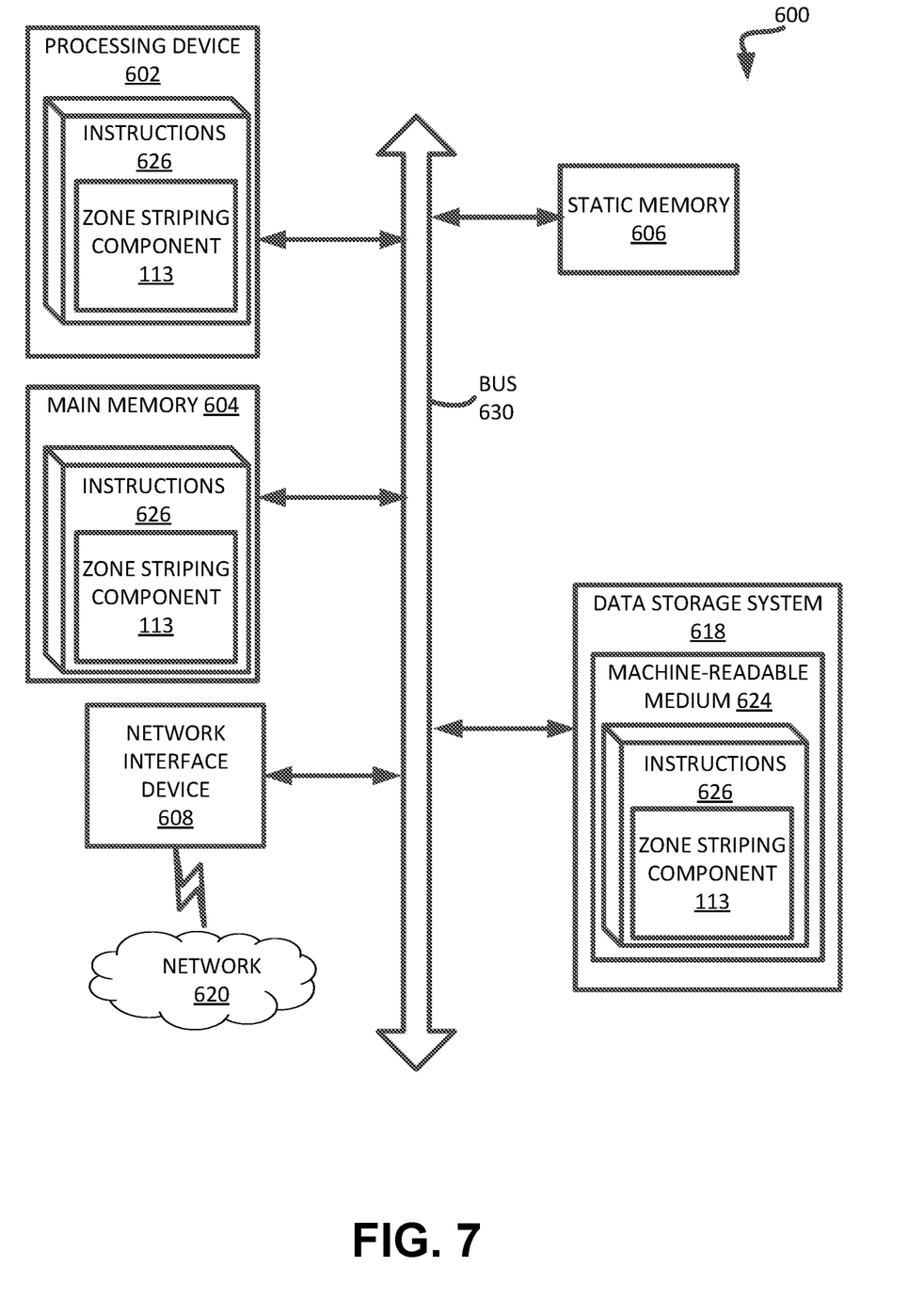
FIG. 7 is a block diagram of an example computer system in which embodiments of the present disclosure may operate.

FIG. 7 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the zone striping component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a zone striping component (e.g., the zone striping component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a plurality of memory devices;
   a processing device, operatively coupled with the plurality of memory devices, to perform operations comprising:
   determining a memory range associated with data stored in a zone namespace comprising a plurality of zones and requested by a data stream associated with a host system, wherein the zone namespace requires sequential writes from a beginning of each of the plurality of zones, and wherein the data stored in the zone namespace cannot be arbitrarily overwritten;

identifying the plurality of zones in the zone namespace for the memory range at the plurality of memory devices, wherein the data is distributed across the plurality of zones, wherein each of the plurality of memory devices comprises zones associated with a plurality of different data streams, and wherein each of the plurality of different data streams is associated with zones across the plurality of memory devices; and performing a striped memory access operation on the plurality of zones to retrieve the data from the plurality of zones in parallel.

2. The system of claim 1, wherein identifying a plurality of zones in the zone namespace comprises identifying a plurality of zones in the zone namespace based on indices of the plurality of zones.

3. The system of claim 1, wherein identifying a plurality of zones in the zone namespace comprises identifying a first zone on a first memory device and a second zone on a second memory device.

4. The system of claim 1, wherein identifying a plurality of zones in the zone namespace comprises identifying a first zone on a first memory device and a second zone on the first memory device.

5. The system of claim 1, wherein performing a striped memory access operation on the plurality of zones comprises accessing a plurality of zone blocks from the zone namespace by accessing, in parallel, a first zone block from a first zone and a second zone block from a second zone.

6. The system of claim 1, wherein the processing device is to perform operations further comprising:
programming data to the memory range at a write pointer of the memory range, wherein the write pointer of the memory range is determined by:
determining a write pointer for each of the plurality of zones corresponding to the memory range; and
determining the write pointer for the memory range as a sum of the write pointers for the plurality of zones.

7. The system of claim 1, wherein the zone namespace is addressable sequentially.

8. A method comprising:
receiving a data stream from an application, wherein the data stream comprises a plurality of data blocks;
segmenting a data block into a plurality of zone blocks; and
storing the plurality of zone blocks in a plurality of zones in a zone namespace, wherein the plurality of zone blocks is distributed across the plurality of zones on a plurality of memory devices, wherein the zone namespace requires sequential writes from a beginning of each of the plurality of zones, wherein the data stored in the zone namespace cannot be arbitrarily overwritten, wherein each of the plurality of memory devices comprises zones associated with a plurality of different data streams, and wherein each of the plurality of different data streams is associated with zones across the plurality of memory devices.

9. The method of claim 8, wherein storing the plurality of zone blocks in a plurality of zones in a zone namespace comprises storing the plurality of zone blocks in the plurality of zones based on indices of the plurality of zones.

10. The method of claim 8, wherein storing the plurality of zone blocks in a plurality of zones in a zone namespace comprises storing a first zone block to a first zone on a first memory device and a second zone block to a second zone on a second memory device.

11. The method of claim 8, wherein storing the plurality of zone blocks in a plurality of zones in a zone namespace comprises storing a first zone block to a first zone on a first memory device and a second zone block to a second zone on a first memory device.

12. The method of claim 8, further comprising accessing a plurality of zone blocks from the zone namespace by accessing, in parallel, a first zone block from a first zone and a second zone block from a second zone.

13. The method of claim 8, wherein storing the plurality of zone blocks in a plurality of zones in a zone namespace comprises:
determining a write pointer for each of the plurality of zones; and
storing the plurality of zone blocks in the plurality of zones at each respective write pointer.

14. The method of claim 8, wherein the zoned addressable memory region is addressed sequentially across the plurality of zones.

15. A non-transitory computer-readable storage medium comprising instructions that, when executed by a processing device, cause the processing device to perform operations comprising:
determining a memory range associated with data stored in a zone namespace comprising a plurality of zones and requested by a data stream associated with a host system, wherein the zone namespace requires sequential writes from a beginning of each of the plurality of zones, and wherein the data stored in the zone namespace cannot be arbitrarily overwritten;
identifying the plurality of zones in the zone namespace for the memory range at a plurality of memory devices, wherein the data is distributed across the plurality of zones, wherein each of the plurality of memory devices memory devices comprises zones associated with a plurality of different data streams and wherein each of the plurality of different data streams is associated with zones across the plurality of memory devices; and
performing a striped memory access operation on the plurality of zones to retrieve the data from the plurality of zones in parallel.

16. The non-transitory computer-readable storage medium of claim 15, wherein identifying a plurality of zones in the zone namespace comprises identifying a plurality of zones in the zone namespace based on indices of the plurality of zones.

17. The non-transitory computer-readable storage medium of claim 15, wherein identifying a plurality of zones in the zone namespace comprises identifying a first zone on a first memory device and a second zone on a second memory device.

18. The non-transitory computer-readable storage medium of claim 15, wherein identifying a plurality of zones in the zone namespace comprises identifying a first zone on a first memory device and a second zone on the first memory device.

19. The non-transitory computer-readable storage medium of claim 15, wherein performing a striped memory access operation on the plurality of zones comprises accessing a plurality of zone blocks from the zone namespace by accessing, in parallel, a first zone block from a first zone and a second zone block from a second zone.

20. The non-transitory computer-readable storage medium of claim 15, wherein the processing device is to further perform operations comprising:
- programming data to the memory range at a write pointer of the memory range, wherein the write pointer of the memory range is determined by:
- determining a write pointer for each of the plurality of zones corresponding to the memory range; and
- determining the write pointer for the memory range as a sum of the write pointers for the plurality of zones.

* * * * *